United States Patent
Morel-Jean

(10) Patent No.: US 8,636,045 B2
(45) Date of Patent: Jan. 28, 2014

(54) TIRE PROVIDED WITH TWO PROTUBERANCES FOR DEFLECTING LATERAL EXPULSIONS OF WATER

(75) Inventor: Jacques Morel-Jean, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 624 days.

(21) Appl. No.: 11/665,192

(22) PCT Filed: Oct. 12, 2005

(86) PCT No.: PCT/EP2005/055197
§ 371 (c)(1),
(2), (4) Date: May 17, 2007

(87) PCT Pub. No.: WO2006/040331
PCT Pub. Date: Apr. 20, 2006

(65) Prior Publication Data
US 2008/0196807 A1    Aug. 21, 2008

(30) Foreign Application Priority Data
Oct. 12, 2004    (FR) ..................... 04 10828

(51) Int. Cl.
*B60C 3/06* (2006.01)
*B60C 13/02* (2006.01)
(52) U.S. Cl.
USPC .......................................... 152/523; 152/455

(58) Field of Classification Search
USPC .......................................................... 152/525
See application file for complete search history.

(56) References Cited

U.S. PATENT DOCUMENTS

| | | | | |
|---|---|---|---|---|
| 2,572,259 | A | * 10/1951 | Gottschall | ..................... 152/523 |
| 3,976,115 | A | 8/1976 | Mirtain et al. | |
| 4,356,985 | A | 11/1982 | Yeager et al. | |
| 6,123,131 | A | * 9/2000 | Takada | ......................... 152/454 |
| 6,460,584 | B1 | 10/2002 | De Labareyre | |

FOREIGN PATENT DOCUMENTS

| | | | |
|---|---|---|---|
| DE | 3307960 | * | 9/1984 |
| JP | 63-170110 | * | 7/1988 |
| JP | 63-215405 | * | 8/1988 |
| JP | 03-228903 | * | 10/1991 |
| JP | 2001-1720 | * | 1/2001 |
| JP | 2004-268665 | * | 9/2004 |

* cited by examiner

*Primary Examiner* — Justin Fischer
(74) *Attorney, Agent, or Firm* — Dickinson Wright PLLC

(57) ABSTRACT

Heavy goods vehicle tire including beads, sidewalls and a tread. To deflect the flow of water expelled laterally by this tire while running on a wet road, the tire is provided on each of its sidewalls, and near the tread, with a protuberance. One protuberance is positioned on the tire so as to be effective over a first period of use of the tire and the other protuberance is positioned on the tire so as to be effective after the tread has partially worn away, and after the worn tire has been reversed so as to place such other protuberance to the outside of the vehicle.

13 Claims, 2 Drawing Sheets

TIRE PROVIDED WITH TWO PROTUBERANCES FOR DEFLECTING LATERAL EXPULSIONS OF WATER

BACKGROUND

The invention relates to tires for heavy goods vehicles and in particular to tires that are provided with devices for deflecting lateral expulsions of water when a vehicle equipped with said tires runs along a roadway covered with water.

When driving in rainy weather, the maneuvers of passing or overtaking a heavy goods vehicle are often very fraught for other road users owing to the large amount of water that may be expelled laterally by said vehicle, which water, on reaching the windscreens of the other vehicles, considerably reduces visibility.

A heavy goods vehicle tire is in general made up of two beads intended to be in contact with a wheel rim, a crown provided with a tread having a running surface intended to be in contact with the ground when the vehicle is running, and two sidewalls for joining this tread to the beads.

Such a tire is reinforced by a carcass reinforcement extending from one bead to the other and a crown reinforcement located radially to the outside of the carcass reinforcement, this crown reinforcement comprising at least two superposed reinforcing plies, that is to say plies placed one against the other. Each ply of the crown reinforcement is in general made up of a plurality of reinforcements placed so as to make an angle ranging from 0° to 70° with the circumferential direction. However, it is not excluded for the angle of the reinforcements to be greater than 70°.

The tread of a heavy goods vehicle tire is provided with a sculpture formed from raised elements bounded by cuts (grooves and/or incisions) designed to ensure, among other things, that the tire adheres properly to a wet road.

The tire has a maximum width dimension L measured at its sidewalls when it is fitted onto its wheel and subjected to its nominal pressure and load conditions in use (L represents the maximum distance between the points on the sidewalls that are axially furthest apart).

European Patent EP 1 048 489 (corresponding to de Labareyre U.S. Pat. No. 6,460,584) describes the use of a device comprising at least one protuberance made of rubber compound provided on at least one of the sidewalls of the tire.

The purpose of the protuberance is to deflect/modify the path of the flow of liquid expelled so that this flow is not expelled excessively upwards, forming a spray that hampers the other road users, especially those overtaking or passing the vehicle.

The solution described in that patent makes it possible to limit the temperature rise inside the tread and especially near the ends of the crown reinforcement plies.

However, it appears that, when in use, the protuberance described in that patent loses its effectiveness as the tread wears away, since the protuberance, owing to the very wear, tends to become closer and closer to the surface of the roadway.

SUMMARY OF INVENTION

The tire of the invention seeks to improve this state of affairs by proposing a solution such that the minimum distance of the water expelling device is always greater than a minimum effective distance from the roadway throughout the duration of use of the tire (that is to say until the level corresponding to the wear limit is reached, when the tire has to be changed or retreaded, with a new tread put into place).

For this purpose, a heavy goods vehicle tire comprises:
two beads intended to be in contact with a wheel rim,
a crown provided with a tread having a running surface intended to be in contact with the ground when the vehicle is running,
two sidewalls for joining this tread to the beads,
a first protuberance projecting from one of said sidewalls and a second protuberance projecting from the other of said sidewalls for laterally deflecting water expulsions when running on a wet road, said protuberances being radially offset relative to the running surface,
this tire being characterized in that the radial offsets of the first and second protuberances are different.

By definition, the radial offset of a protuberance is measured, on a meridian section (that is to say in a plane containing the rotation axis), as the radial distance (i.e. perpendicular to the rotation axis) between a point on the outer profile of the protuberance obtained as the point of tangency of a tangent line to said outer profile and passing through an axially outermost point on the tread on the same side as the protuberance and an axially outermost point on the tread.

The outer profile of a protuberance comprises, on either side of this point of tangency, a radially external first profile and a radially internal second profile, these first and second profiles joining the external profile of the sidewall of the tire.

Preferably, the difference in the radial offsets is at least equal to one half of the thickness of the tread, the thickness of the tread being measured in the new state between the running surface of said tread and the first crown reinforcing ply of the tire.

In an advantageous embodiment of a tire according to the invention, each protuberance lies entirely radially on the inside of a profile identical to the transverse profile of the tread, this profile being displaced radially inwards by at least one half of the thickness of said tread so as to reduce the amount of additional rubber compound associated with the presence of a protuberance.

Thanks to the tire according to the invention, it is possible for the user to choose the sense in which said tire is fitted, by placing, so as to be on the outside of the vehicle, either one of the protuberances or the other, it being understood that, preferably, a new tire according to the invention is placed on a vehicle in such a way that the sidewall that includes the protuberance having the smallest radial offset (that is to say the one in which the external wall is closest to the roadway) is located on the outside of the vehicle on which said tire is to be fitted. To make the fitting of the unworn tire easier, it is preferable for this tire to be provided with a visible sign for indicating the sense in which it is to be fitted onto a vehicle, the protuberance whose radial distance from the points of connection between the external and internal walls is greatest being placed to the outside of the vehicle.

After the tread of a tire according to the invention has partly worn away, said tire is then turned round on its wheel rim so as to present the second protuberance on the sidewall to the outside of the vehicle, which second protuberance, since it was substantially further away from the roadway than the first protuberance, is then effective since it is at a radial distance from the roadway greater than that of the other protuberance.

Whenever the tire comprises a crown reinforcement located radially to the outside of the carcass reinforcement, this crown reinforcement comprising at least two superposed plies and each ply being provided with reinforcements in the form of wires or cables, it is judicious to apply the teachings of patent EP 1 048 489. In this case, the protuberance located closest to the running surface of the new tire meets the criteria indicated in that patent (the other protuberance being even further away from said surface, itself meets these criteria).

In this way, it is possible both to obtain a lasting effect throughout the duration of use of a tire according to the invention and to limit the temperature rise near the ends of plies resulting from the addition of rubber material.

According to the invention, the arrangement of the protuberances on each of the sidewalls also makes it possible, whenever the radially internal profile of said protuberances is appropriate, for all the tires to be easily stacked one on top of another owing to the fact that the protuberances no longer prevent this stacking. Arrangements are made for a sidewall provided with a protuberance initially furthest away from the running surface to be in contact with a sidewall provided with a protuberance located closest to the running surface. The expression (appropriate radially internal profile) is understood to mean here that this must allow the protuberance of another tire to be accommodated when stacked. This profile is said to be (complementary) whenever it is possible for the protuberances to be nested one in the other whilst still having lateral contact between said protuberances. Thus, it is possible to obtain a centring and locking effect when a stack of tires is formed.

The invention also proposes a method of using tires comprising sidewalls, a tread and a protuberance on each sidewall for deflecting lateral water expulsions, said method consisting in:

producing such tires by providing, on a sidewall, a first protuberance with a first radial offset relative to the external surface of the tread and a second protuberance on the other sidewall with a second radial offset, the first radial offset being less than the second radial offset;

fitting in the unworn state, onto an axle of a heavy goods vehicle, such tires in the right position and in the left position in such a way that said tires have their sidewalls provided with the first protuberances oriented towards the outside of said vehicle;

each of said tires is reversed on its wheel after the treads have partially worn away in order to make the sidewalls provided with the second protuberances oriented towards the outside of the vehicle so as to continue the wear of the tread until the intended wear limit is reached.

Preferably, the tires according to the invention are fitted onto the front axle.

BRIEF DESCRIPTION OF THE DRAWINGS

The invention will be more clearly understood with the aid of the drawing appended to the present description, this drawing comprising the embodiments given by way of non-limiting examples.

For the sake of simplification, the same physical elements in the figures have the same reference symbols.

DETAILED DESCRIPTION OF PREFERRED EMBODIMENTS

Figure 1:
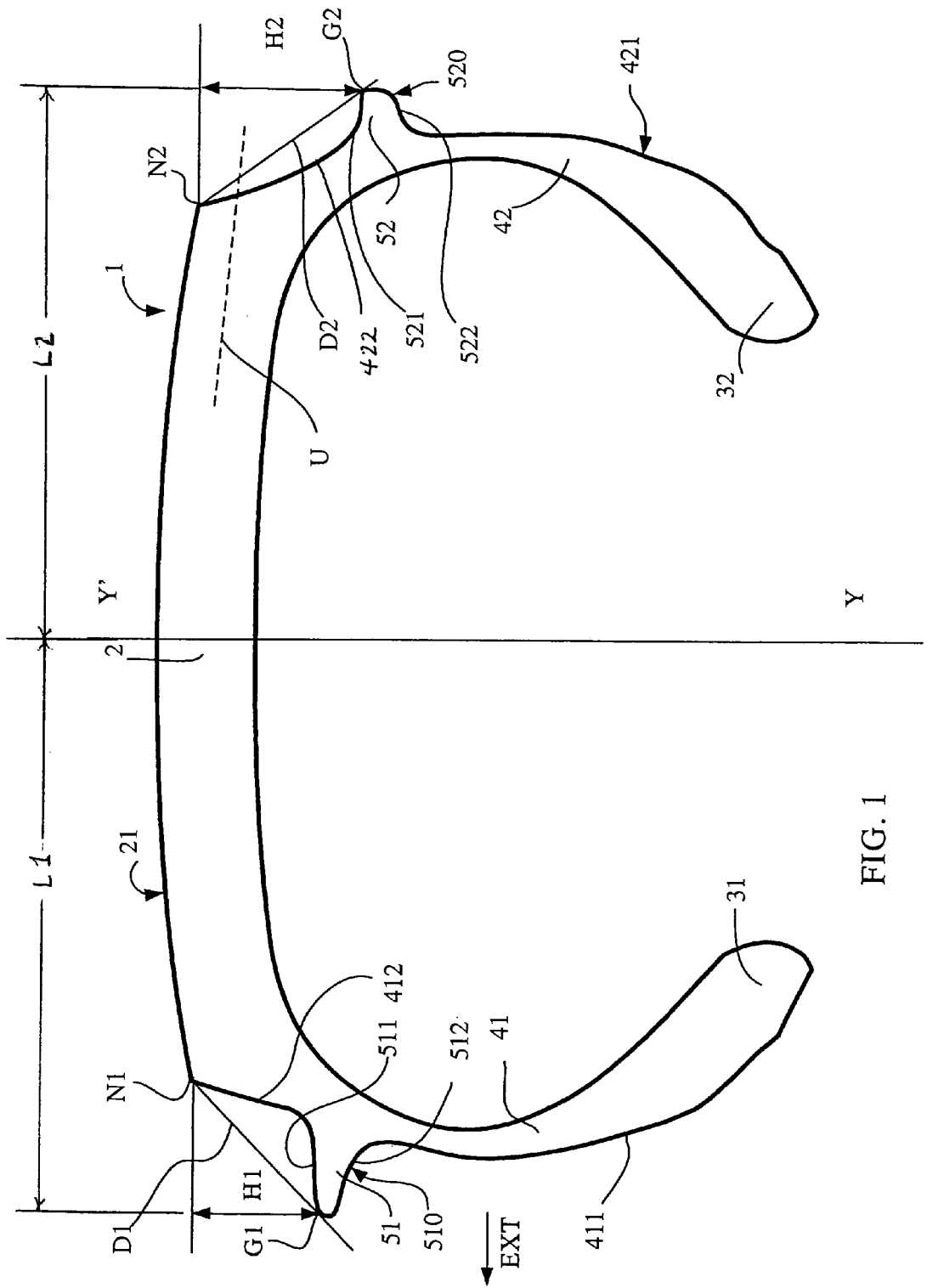
FIG. 1 shows a schematic meridian section through a heavy goods vehicle tire according to the invention that includes a protuberance on each of its sidewalls.

FIG. 1 shows a partial cross section through a heavy goods vehicle tire according to the invention in a meridian plane, that is to say in a plane containing the rotation axis of said tire.

This tire 1, of 315/70 R 22.5 size, comprises a crown region 2 joined to beads 31, 32 by sidewalls 41, 42 respectively. The crown 2 of the tire has a running surface 21 radially to the outside, this surface being intended to come into contact with the roadway when the tire is in use. This surface 21 terminates axially at two points N1 and N2 to which the external profiles of the sidewalls 41, 42 are joined. The points N1 and N2 correspond to the axially outermost points of the contact imprint of the running surface under the nominal conditions of using the tire. The shown in FIG. 1 corresponds to the tire upon leaving the vulcanization mould.

A protuberance arrangement projecting to the outside of the tire may be seen on each sidewall 41, 42. Each protuberance arrangements consists of a single protuberance 51 or 52 which is in the present case produced by moulding at the same time as the moulding and vulcanization of the tire 1.

The protuberance 51 (or 52), is bounded by an external surface (the profile 510—or 520—of which may be seen in the cross section) comprising an upper surface portion 511 (or 521) radially to the outside and a lower surface portion 512 (or 522) radially to the inside, said two surface portions intersecting along a line, the trace of which in the plane of section corresponds to a point G1 (or G2). G1 (or G2) denotes the point of tangency of a virtual line D1 (or D2) passing through the axial end point N1 (or N2) of the running surface 21 and tangential to the outer profile 510 (or 520) of the protuberance 51 (or 52).

The outer profile of the sidewall 41 (or 42) consists of the following three parts:

an almost straight part 412 (or 422) starting at the point N1 and extending radially inwards and axially outwards;

a part 411 (or 421) of the profile of the sidewall joined to the bead 31 (or 32); and the outer profile 510 (or 520) of the protuberance 51 (or 52) joining the first two sidewall profile parts.

According to the invention, the tire 1 is fitted onto a vehicle in such a way that its sidewall 41 is placed to the outside of said vehicle (indicated by the arrow marked EXT), the radial distance H1 between the point G1 and the point N1 being less than the radial distance H2 between the point G2 and the point N2. The expression (radial distance between two points) is understood to mean the distance between these points that is measured in a direction perpendicular to the rotation axis. It will thus be appreciated that the two protuberance arrangements are non-symmetrical relative to a center equatorial plane Y-Y' of the tire.

In this way, the effectiveness of the tire is ensured during its first phase of use, that is to say at least until wear corresponding to the level indicated in FIG. 1 by the dotted curve U is reached.

After this first phase of use, the tire is then fitted onto the same vehicle in such a way that the protuberance 52 is from then on positioned to the outside of said vehicle in order to modify the path of the flow of liquid expelled while still being at an appropriate distance from the ground. Owing to the initial difference in height between the two protuberances, the protuberance 52 is now at a distance from the ground substantially identical to that of the protuberance 51 in the unworn state.

Preferably, the difference in radial distance (equal to the difference between the distances H1 and H2) between the points G1 and G2 is at least equal to the height of rubber compound worn away between the unworn state and the level of wear identified by the curve U.

In the case presented in FIG. 1, the protuberances 51 and 52 have geometrical profiles, seen in the meridian sectional plane of FIG. 1, which are not the same. They are distinguished by respective axial distances L1 and L2, which are different. The axial distance L1 of the protuberance 51, measured in the axial direction from the plane Y-Y' to the axially outermost point on the sidewall 41 provided with said protuberance, is greater than the axial distance L2 of the protuberance 52, measured from the plane Y-Y' to the axially outermost point on the sidewall 42 bearing the protuberance 52.

Figure 2:
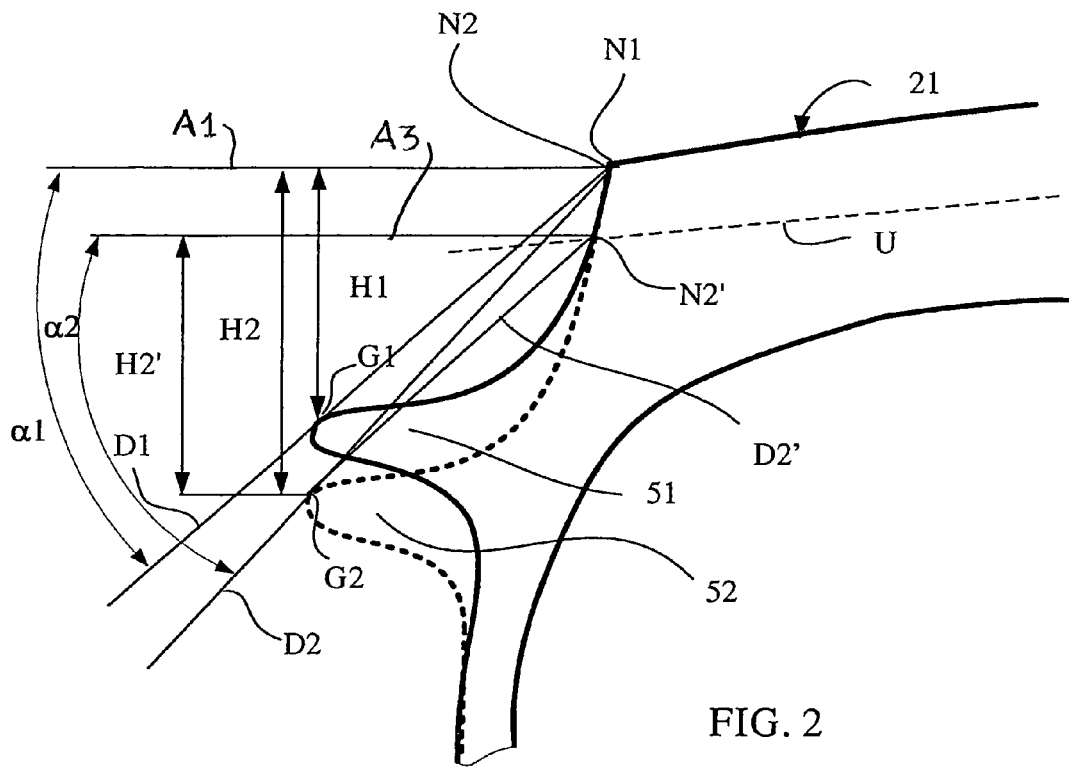
FIG. 2 shows, in superposition, an embodiment of protuberances on the sidewalls of one and the same tire.

FIG. 2 shows a superposition of the profiles of the protuberances 51 and 52 of an advantageous embodiment of the tire according to the invention demonstrating that L1 and L2 are equal. Apart from an offset in the radial direction, these protuberances 51 and 52 have in this case an identical profile in cross section.

In this embodiment, the protuberances are designed so that, in the unworn state, the virtual straight lines D1 and D2 make different angles $\alpha 1$ and $\alpha 2$ respectively, with lines A1 and A3 which are parallel to the tire's axis. The straight lines D1 and D2 pass through the axial end points N1 and N2 of the running surface 21 and are tangential to the protuberances 51 and 52 at the points G1 and G2, respectively. According to the invention, the points G1 and G2 are at distances H1 and H2 from a straight line parallel to the rotation axis and passing through the points N1 and N2, respectively.

After wear substantially equal to one half of the thickness of the tread to be worn away (this level of wear being indicated by the dotted line U), the virtual straight line D2' passing through the new axial end point N2' of the running surface and tangential to the protuberance 52 initially placed to the inside of the vehicle is substantially parallel to the straight line D1 tangential to the protuberance 51 initially placed to the outside of the vehicle. In this way, even after partial wear corresponding to one half of the thickness of the tread, the effectiveness remains unchanged.

Each protuberance lies entirely radially on the inside of a profile U identical to the transverse profile of the tread and this profile being displaced radially inwards by at least one half of the thickness of said tread, so as to reduce the amount of additional rubber compound associated with the presence of a protuberance.

In the embodiments shown in FIGS. 1 and 2, respectively, the reinforcing elements of the internal structure of the tire have not been shown so as not to complicate said figures. Of course, the teachings of document EP 1 048 489 may advantageously be applied to both these embodiments: in this case, the protuberances are placed taking into account the internal reinforcing elements so as to limit the thermal impact on the rubber compounds resulting from said protuberances.

Although it is preferred to produce protuberances in the circumferential direction that are continuous, it will not be outside the scope of the invention to produce at least one of the protuberances in the circumferential direction that is discontinuous, the discontinuity being appropriate so as not to excessively reduce the expected effect on the deflection of the liquid flow when in use.

Figure 3:
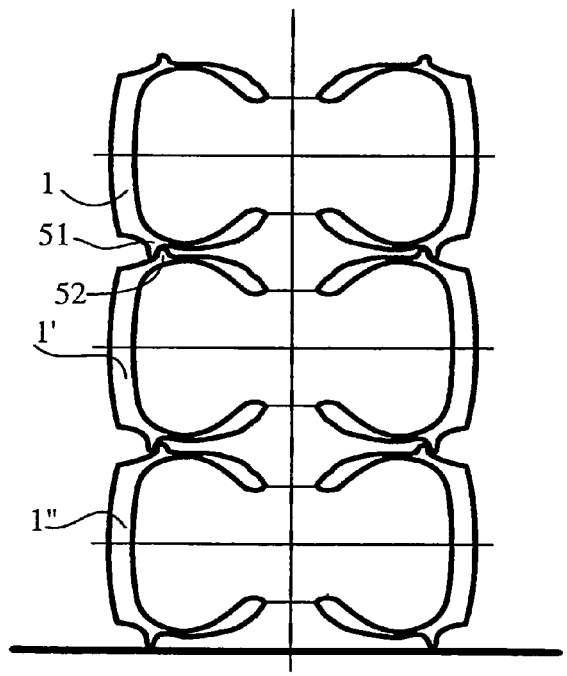
FIG. 3 shows the formation of a stack of tires provided with protuberances according to the invention.

FIG. 3 shows a stack of three identical tires 1, 1' and 1". Each of these tires has a protuberance 51 on one sidewall and a protuberance 52 on the other sidewall, said protuberances being positioned according to the invention. Thanks to the difference in radial distance of these protuberances, it is easy to form a stack as shown, the sidewall 41 provided with a protuberance 51 of a tire 1 being in contact with the sidewall 42 provided with a protuberance 52 of a tire 1'. By choosing the difference in radial distance of the protuberances and the radially internal geometries of the profiles of said protuberances (as shown), it is possible to obtain a centring effect of all of the tires of a given stack.

The invention claimed is:

1. A heavy-goods vehicle tire comprising:
   two beads adapted to be mounted on a wheel rim and disposed on respective first and second sides of the tire;
   a crown provided with a tread having a running surface adapted to contact the ground;
   first and second sidewalls for joining the respective beads to the tread;
   first and second protuberances projecting from respective first and second sidewalls for laterally deflecting water expulsions when running on a wet road, wherein the first protuberance is located radially between the second protuberances and the unworn running surface;
   each of the first and second protuberances being located entirely radially outwardly of an axially outermost point of the respective sidewall, and containing the outermost axial point of the tire relative to the side of the tire on which the protuberance is located;
   each of the first and second protuberances on the tire when new being radially offset relative to the running surface, a length of each radial offset being measurable in a meridian section plane of the tire and defined as a distance perpendicular to the tire's axis from an axially outermost first point of the tread on same tire side as the respective protuberance, to a second point where a line extending from such axially outermost point is tangent to an axially outer end of such protuberance's profile, said line making no contact with any portion of the tire disposed between the first and second points;
   wherein the respective lengths of the radial offsets are different from one another, the difference between the lengths of the radial offsets being less than the thickness of the tread; and
   wherein, in an unworn state, a virtual straight line between the axial end point of the running surface and a point of tangency of the first protuberance forms an angle $\alpha 1$ with a line parallel to the tire's axis, and a virtual straight line between the axial end point of the running surface and a point of tangency of the second protuberance forms an angle $\alpha 2$ with the line parallel to the tire's axis, such that $\alpha 1$ is smaller than $\alpha 2$.

2. The tire according to claim 1 wherein the difference between the lengths of the radial offsets is equal to at least one half of the tread thickness.

3. The tire according to claim 1 wherein each protuberance lies entirely radially on the inside of a profile identical to the transverse profile of the tread, which profile is displaced radially inwards by at least one half of the thickness of the tread.

4. The tire according to claim 1 wherein the first and second protuberances are configured to enable multiple ones of the tires to be stacked in axial alignment such that the first protuberance of one tire overlies the second protuberance of an adjacent tire.

5. The tire according to claim 1 wherein the tire includes a visible indication that the tire when new is to be mounted on a vehicle such that the protuberance with the shorter radial offset is to face outwardly of the vehicle.

6. The tire according to claim 1, wherein the protrusion with the shorter radial offset extends continuously in the circumferential direction.

7. The tire according to claim 6 wherein the tire includes a visible indication that the tire when new is to be mounted on a vehicle such that the protuberance with the largest radial offset faces outwardly of the vehicle.

8. A method of using a tire on a heavy goods vehicle, the tire comprising sidewalls, a tread with a running surface, and first and second protuberances projecting from respective sidewalls for deflecting lateral water expulsions, wherein the first protuberance is located radially between the second protuberance and the unworn running surface; a length of each radial offset being measurable in a meridian section plane of the tire and defined as a distance perpendicular to the tire's axis from an axially outermost first point of the tread on same tire side as the respective protuberance, to a second point where a line extending from such axially outermost point is tangent to an axially outer end of such protuberance's profile, said line making no contact with any portion of the tire disposed between the first and second points; each of the first and second protuberances being located entirely radially outwardly of an axially outermost point of the respective sidewall, and containing the outermost axial point of the tire relative to the side of the tire on which the protuberance is located; the first and second protuberances having respective radial offsets from the running surface, wherein the length of the radial offset of the first protuberance is shorter than that of the second protuberance such that the first and second protuberance arrangements are non-symmetrical relative to a center equatorial plane of the tire, and wherein, in an unworn state, a virtual straight line between the axial end point of the running surface and a point of tangency of the first protuberance forms an angle α1 with a line parallel to the tire's axis, and a virtual straight line between the axial end point of the running surface and a point of tangency of the second protuberance forms an angle α2 with the line parallel to the tire's axis, such that α1 is smaller than α2 the method comprising :
A) mounting the tire, when new, on a heavy goods vehicle such that the first protuberance faces in a direction outwardly of the vehicle in accordance with a visual indication disposed on the tire indicating that the first protuberance arrangement in said direction outwardly of the vehicle,
B) after the tread has partially worn away, reversing the tire such that the second protuberance faces in the direction outwardly of the vehicle.

9. The method according to claim 8 wherein the difference between the lengths of the radial offsets is at least equal to one half of the tread thickness.

10. The method according to claim 8 wherein each protuberance lies entirely radially on the inside of a profile identical to the transverse profile of the tread, which profile is displaced radially inwards by at least one half of the thickness of the tread.

11. The method according to claim 8 wherein the first and second protuberances are configured to enable multiple ones of the tires to be stacked in axial alignment with the first protuberance of one tire overlying the second protuberance of an adjacent tire.

12. The method according to claim 8 wherein step A comprises mounting the tire on a front axle of the vehicle.

13. The method according to claim 12 wherein step B comprises reversing the tire after at least one half of the tread thickness has worn.

\* \* \* \* \*